United States Patent [19]

Wilson et al.

[11] Patent Number: 4,938,554

[45] Date of Patent: Jul. 3, 1990

[54] TEMPERATURE COMPENSATED FIBER OPTIC BYPASS SWITCH

[75] Inventors: Mark L. Wilson, Vadnais Heights; Stanley J. Lins, Bloomington, both of Minn.

[73] Assignee: Unisys Corporation, Blue Bell, Pa.

[21] Appl. No.: 331,763

[22] Filed: Apr. 3, 1989

[51] Int. Cl.[5] .......................... G02B 6/26; H01J 5/16; G02F 1/11

[52] U.S. Cl. .................... 350/96.15; 350/96.13; 350/96.16; 350/358; 250/227.14

[58] Field of Search ............... 350/96.13, 96.14, 96.15, 350/96.16, 96.19, 358, 355, 356; 331/10, 11, 16, 17; 250/227

[56] References Cited

U.S. PATENT DOCUMENTS

| | | | |
|---|---|---|---|
| 4,422,154 | 12/1983 | Smithline et al. | 350/358 X |
| 4,799,777 | 1/1989 | Edouard et al. | 350/358 |
| 4,824,200 | 4/1989 | Isono et al. | 350/96.16 |

FOREIGN PATENT DOCUMENTS

| | | | |
|---|---|---|---|
| 55-83030 | 6/1980 | Japan | 350/358 X |
| 59-15917 | 1/1984 | Japan | 350/358 X |

Primary Examiner—Brian Healy
Attorney, Agent, or Firm—Seymour Levine; Glenn W. Bowen; Robert S. Bramson

[57] ABSTRACT

A variable refractive index device, such as a Bragg cell, is temperature stabilized by sensing ray path deviations of a secondary diffracted beam. Two photodetectors with centers offset from the exit position of the central ray of the beam at normal temperature operation receive light energy as a function of the deviation of this ray path from the normal position. Light in each fiber is detected to derive electrical signals that are utilized to establish a correction signal to a voltage controlled oscillator which varies the frequency thereof and compensates for the diffraction deviations caused by temperature variations.

4 Claims, 1 Drawing Sheet

TEMPERATURE COMPENSATED FIBER OPTIC BYPASS SWITCH

BACKGROUND OF THE INVENTION

1. Field of the Invention

The invention pertains to switching optical signals and more particularly to the compensation of temperature induced diffraction angle variations in switches.

2. Description of the Prior Art

High information transmission capacity, immunity to electromagnetic interference, and freedom from ground loop problems ideally suit optical transmission systems for linking distributed computers, computer controlled industrial components, and other data transmission systems. These optical transmission systems utilize optical fibers to serially link a multiplicity of optical repeater stations. A power failure at one of the serial link stations, however, may interrupt the data chain and cause the entire system to fail. To prevent such a catastrophe, a fail safe optical switch is employed at each repeater which operates to bypass that station when a fault occurs, as for example, a power loss. These fail safe switches must possess low insertion loss properties, and provide high isolation between the input and output optical fibers during the "Power On" mode. Many such networks have hundreds, if not thousands of data stations each requiring a bypass switch, making the cost of the by-pass a major factor.

Conventionally, the optical switches utilized have been mechanical in nature. Mechanical switches, though relatively inexpensive, inherently include moving parts and generally require high driving power. These moving parts are subject to wear, abrasion, fatigue and other mechanical stresses and as a consequence are themselves prone to failure.

Optical switches, utilizing a liquid crystal material, as the optical signal direction control mechanism have been proposed. At present, however, these proposed liquid crystal switches are expensive, temperature sensitive, and difficult to mass produce. As proposed, these devices employ a series of triangular prisms, having optically flat surfaces. These prisms are difficult to manufacture and represent the bulk of the manufacturing costs of the switch. Further manufacturing difficulty arises due to the requirement that the optically flat bases of the prism be parallel and laterally aligned to insure that the path of the light beams passing therethrough maintain a prescribed path.

Other types of optical switches in the prior art utilize a Faraday rotator comprising YIG crystal to effect polarization rotation of the optical signal and a polarization separator to accomplish the desired switching. These switches exhibit excessive inertia due to the wiring in an electromagnet required to establish the necessary magnetic field about the YIG to produce the polarization rotation. Additionally, large amounts of electrical current must pass through the coils to establish the required magnetic field. The current may be reduced somewhat with additional turns of wire, but this adds to the inertia of the switch. Further, the YIG crystal is construed as a slab optical waveguide and presents an interface problem with the optical fibers of the data system.

Another bypass switch of the prior art utilizes PLZT wafers to which an electrical voltage is applied to effectuate a polarization rotation. This switch, as do the other polarization sensor devices, requires polarization beamsplitters to direct the polarized light and collimating and focussing lenses for interfacing the PLZT wafers with the optical fibers. In addition to requiring the high voltage to provide the necessary polarization rotation, the PLZT wafers are difficult and expensive to manufacture. Further, the necessary electrode through which the wafer voltage is applied must be positioned on the wafer clear of the light path, adding to the cost and size of the manufactured switch.

An optical switch which overcomes many of the above-discussed deficiencies of the prior art is disclosed in U.S. patent application Ser. No. 07/245,593, now U.S. Pat. No. 4,902,087, of Stanley J. Lins, et al for "Fiber Optic Bypass Switch", filed Sept. 19, 1988 and assigned to the assignee of the present invention, herein incorporated by reference. In accordance with its principals, that invention includes an acoustic sensitive device, such as a Bragg cell, having an index of refraction that is variable in accordance with an applied acoustic signal. This acoustic signal may be provided to the device by an electro-acoustic transducer responsive to an electrical signal coupled thereto. Prior to the application of the electrical signal, light signals incident to an input port on one side of the device exit from an output port on the other side which is in-line with the input port. When an electrical signal is applied, the transducer provides bulk acoustic waves that fill the device and refract the light to a second output port, the position of which is determined by the refracted index change caused by the bulk acoustic waves. If two input ports are provided, the switch may be utilized as a bypass switch where, in the unenergized mode, light incident to the first input port is coupled to a first output port in alignment therewith, while in the energized mode, light incident to the first input port is coupled to a second output port displaced from the first output port. A second input port may be positioned adjacent to the first input port in such a manner that when the device is energized, light incident to the second input port is refracted to the first output port.

A bypass switch utilizing a Bragg cell will, in the energized mode, couple approximately 90% of the light from the first input port to the second input port, with approximately 9% being coupled to the first output port. Thus, only 10 dB of isolation is provided between the two output ports. In an embodiment of the invention disclosed in U.S. application Ser. No. 245,593, a reflector is positioned at what would be the first output port in such a manner that the light incident from the first input port is reflected therefrom to establish the first output port on the same side of the device as the first input port. In this manner, when the Bragg cell is energized, the approximate 90% of the light energy exits the second output port while the approximate 9% incident to the reflector is reflected therefrom to be refracted once again and to couple about 1% of the light originally incident to the first input port to the first output port, thereby providing approximately 20 dB of isolation between first and second output ports. Additional isolation may be provided between the first and second output ports by positioning a reflector at what would be the first output port with but a single reflection, thereby establishing a second reflection such that the light incident thereto from the first reflector is reflected to exit the Bragg cell at a first output port on a side opposite that of the first input port. Such a second reflection provides an isolation between the first and second output ports of approximately 30 dB. Further additional isolations may be provided by properly positioning additional mirrors along the sides of the Bragg cell.

Though the invention of U.S. application Ser. No. 245,593 operates satisfactorily within a limited temperature range, significant angular diffraction deviations are experienced when a temperature variation exceeding this limitation is encountered. These angular deviations with temperature may be eliminated by placing the switch in a temperature controlled oven to maintain the switch at a constant temperature. This solution, however, requires significant real estate, consumes excessive power, and adds appreciably to the initial and operating cost of a data transmission system.

SUMMARY OF THE INVENTION

In accordance with the principles of the present invention, a two section photodetector is positioned at the output port of a second order diffracted beam in a variable index of refraction device, as for example, a Bragg cell. The center of the photodetector assembly is located at the normal operating temperature exit point of the central ray of the second order beam. Consequently, at normal temperatures, the light output of the secondary beam is equally distributed between the two sections of the photodetector and the electrical output signals from each section will be equal. These electrical output signals are coupled to a differential amplifier which provides a null signal in response to the equal electrical signals provided thereto at the normal operating temperature. The output terminal of the differential amplifier is coupled to a voltage controlled oscillator which provides the acoustic energy that establish the diffraction grating in the Bragg cell.

When a temperature variation is encountered, the diffraction grating is altered, thereby shifting the main and secondary diffracted beams. This shift is sensed by the two section photodetector causing an output signal from the differential amplifier that is proportional to the shift in angle. In response to this output signal change, the voltage controlled oscillator provides an acoustic signal at a shifted frequency to alter the diffraction grating of the Bragg cell in a manner to compensate for the temperature change and maintain the angular positions of the main and secondary diffracted beams.

Other features of the invention will become apparent from the following description and the accompanying drawings which illustrate, as non-limitative examples, preferred embodiments thereof.

BRIEF DESCRIPTION OF THE DRAWINGS

FIGS. 2A–2F are illustrations of light energy distribution between optical devices positioned to receive light from a second order refracted beam.

DESCRIPTION OF THE PREFERRED EMBODIMENT

Figure 1:
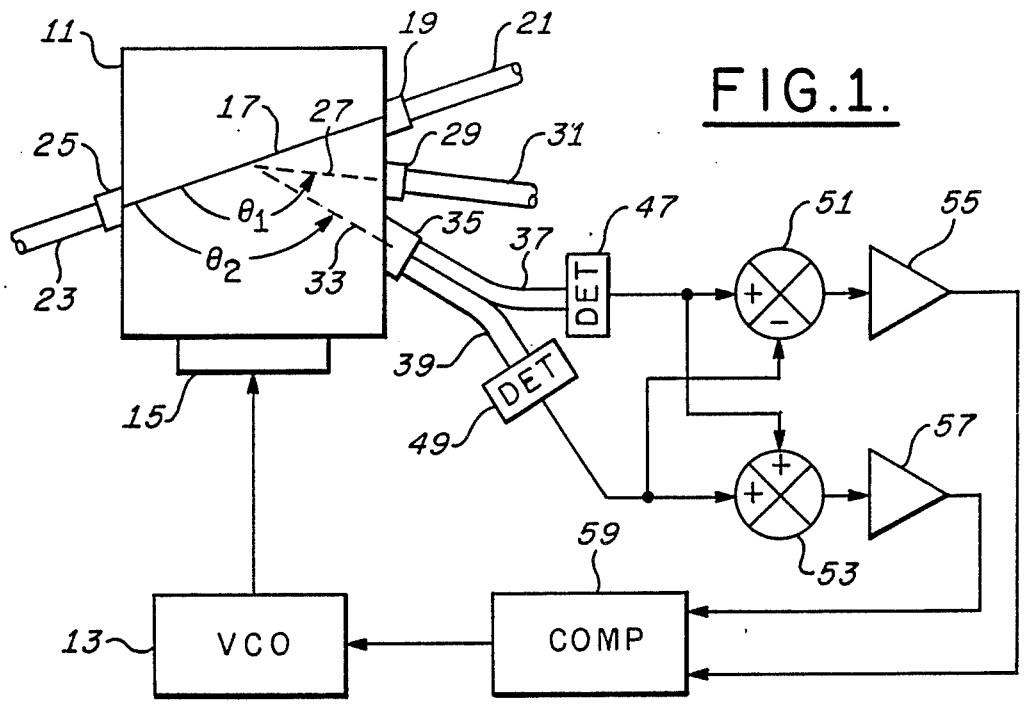
FIG. 1 is a schematic diagram of a preferred embodiment of the invention.

Refer now to FIG. 1. A variable index of refraction device 11, such as a Bragg cell, that is responsive to acoustic signals is coupled to a variable frequency source of electrical signals 13, such as a voltage controlled oscillator (VCO), through an acoustic transducer 15 wherefrom a bulk acoustic wave is launched into the Bragg cell in response to an electrical signal from the source 13.

This bulk acoustic wave causes layers of high and low index of refraction in the cell, thereby establishing a diffraction grating. In the absence of the bulk acoustic wave, a light beam from a light source entering the cell 11 at an input 25 propagates therethrough along a path 17 and may be coupled through an output port 19 to an optical fiber 21.

As stated previously, an electrical signal from the electrical source 13 coupled to the transducer 15 causes a bulk acoustic wave to propagate through the Bragg cell 11, thereby causing the diffraction grating. A monochromatic light signal coupled to the Bragg cell 11 from an optical fiber 23 through an input port 25 will therefore be diffracted from the path 17 at an angle $\theta_1$, to propagate along the path 27 and exit through an output port 29 of the Bragg cell 11 to an optical fiber 31.

Discussions have been directed to the path of a single ray. It is well known that a light beam comprises a multiplicity of rays. The path of a light beam, however, may be determined by the path of the central ray. Consequently, all references to ray paths are to that of the central ray.

When the monochromatic light is diffracted from the ray path 17 to the ray path 27, the light intensity along the ray path 17 is approximately 90% of the light intensity originally propagating along the ray path 17, while approximately 9% continues to propagate along the ray path 17. This 9% is coupled to the optical fiber 21 and appears thereon as noise. Methods of reducing this noise are disclosed in the above-mentioned U.S. patent application Ser. No. 245,593.

In addition to the first order diffracted beam along the ray path 23, Bragg cells when energized diffract about 1% of the incident light in a second order beam at an angular position displaced from the first order diffracted beam. The diffraction angle of this second order beam varies with the frequency of the acoustic wave at a rate that is twice that of the first order diffracted beam and is diffracted from the ray path 17 to the ray path 33 at an angle $\theta_2$ that is less than the angle $\theta_1$. The diffraction angles $\theta_1$ and $\theta_2$ of the first order and second order diffracted beams are temperature sensitive as well as acoustic frequency sensitive. Consequently, temperature variations of the second order diffracted beam ray path 33 may be utilized to vary the frequency of the acoustic wave to preserve the diffraction angles $\theta_1$ and $\theta_2$ and maintain constant directions for the ray paths 17 and 33.

Figures 2A, 2B, 2C:
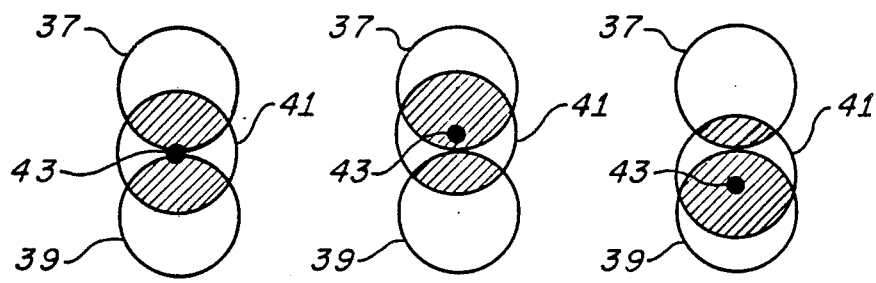

Ray path 33 exits the variable index of refraction device 11 through an exit port 35 whereat optical fibers 37 and 39 are positioned with the centers offset from the exiting position of the ray path 33 at the normal operating temperature. These offsets are equal so that the optical energy incident to the optical fibers 37 and 39 are equal at the normal operating temperature. This situation is illustrated in FIG. 2A, wherein the end faces of the optical fibers 37 and 39 shown illuminated by portions of a light beam 41 having a central ray 43. FIG. 2B illustrates a situation wherein a temperature variation causes a diffraction deviation of the ray 43 from the normal path so that light beam 41 illuminates optical fiber 37 with more light energy than is provided to optical fiber 39. FIG. 2C illustrates the situation wherein a temperature variation causes a diffraction deviation opposite to that illustrated in FIG. 2B. For this situation, the light energy coupled to the optical fiber 39 exceeds the light energy coupled to optical 37.

Figures 2E, 2F:
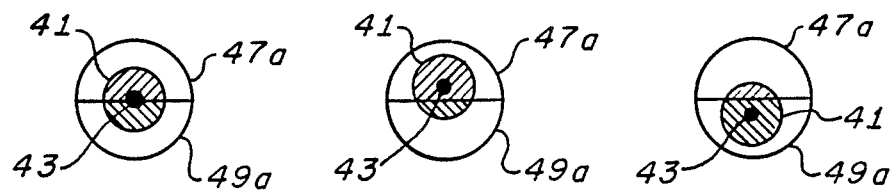

Though the coupling at output port 35 in FIG. 1 is to a pair of adjacent optical fibers, it should be recognized that the output light may be coupled directly to adjacent photodetectors. Optical energy distribution between detectors 47a and 49a for three central ray positions are shown in FIGS. 2D-2F.

Light signals propagating in optical fibers 37 and 39 are incident to photodetectors 47 and 49 respectively, wherefrom electrical signals representative of the intensity of the detected light are coupled to difference circuit 51 and sum circuit 53. The sum and difference of the intensity representative electrical signals are coupled through amplifiers 55 and 57 to a comparator 59 wherefrom a signal representative of the ratio of the difference signal to the sum signal is obtained and coupled to the VCO 13. This ratio is representative of the diffraction deviation caused by temperature variations from the normal operating temperature and is independent of the light intensity coupled through the input port 25. The ratio representative signal adjusts the frequency of the VCO so that the signal provided to the transducer 15 causes a shift in the frequency of the acoustic wave that varies the refractive index of the Bragg cell 11 in a manner to offset that caused by the temperature change, thereby maintaining the normal temperature ray paths 27 and 33.

Though the invention has been described with respect to a device exhibiting an index of refraction variation that is a function of frequency and temperature, those skilled in the art should recognize that it is also applicable to devices that exhibit refractive index variations as functions of voltage pressure, humidity, or applied forces.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for correcting deviations from a normal ray path in a variable index of refraction device having a refractive index that varies as a function of an applied signal and environmental condition comprising:
    means coupled to said device and responsive to correction signals coupled thereto for providing said applied signals;
    first and second optical fibers coupled to said device for receiving light energy that varies as a function of said refractive index, said optical fibers positioned relative to a predetermined diffracted ray in a manner to receive optical energy from said predetermined diffracted ray that is equal in each of said first and second optical fibers,
    means coupled to said first and second optical fibers for providing signals representative of light energy in said first and second optical fibers; and
    means coupled to said representative signals means and said applied signals means for providing said correction signals in response to said representative signals.
2. The apparatus of claim 1 further including:
    detector means coupled to said first and second optical fibers for providing first and second signals representative of light energy levels in said first and second optical fibers, respectively;
    means coupled to said detector means for providing signals representative of relative light energy in said first and second optical fibers in response to signals provided by said detector means; and
    means responsive to said signals representative of relative light energy for providing said correction signals to said applied signals means.
3. The apparatus of claim 2 wherein said applied signals means comprises a voltage controlled oscillator.
4. The apparatus of claim 3 wherein said relative light energy means includes:
    sum means coupled to said detector means for providing a sum signal representative of a sum of light energy in said first and second optical fibers;
    difference means coupled to said detector means for providing a difference signal representative of a difference between light energy in said first and second optical fibers; and
    means coupled to said sum means, and said difference means for providing a correction signal representative of a ratio of said difference signal to said sum signal to said applied signals means.

* * * * *